(12) United States Patent
Lewis

(10) Patent No.: US 11,047,101 B2
(45) Date of Patent: *Jun. 29, 2021

(54) LOW-PROFILE FLUID CONDUIT/COLLECTOR AND SYSTEM

(71) Applicant: WATERSHED GEOSYNTHETICS LLC, Alpharetta, GA (US)

(72) Inventor: Delaney Lewis, West Monroe, LA (US)

(73) Assignee: Watershed Geosynthetics LLC, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/784,637

(22) Filed: Feb. 7, 2020

(65) Prior Publication Data
US 2020/0173129 A1    Jun. 4, 2020

Related U.S. Application Data

(63) Continuation of application No. 16/190,917, filed on Nov. 14, 2018, now Pat. No. 10,697,145.
(Continued)

(51) Int. Cl.
*E02B 11/00* (2006.01)
*B09C 1/00* (2006.01)
(Continued)

(52) U.S. Cl.
CPC .............. *E02B 11/005* (2013.01); *B09B 1/00* (2013.01); *B09B 1/004* (2013.01); *B09C 1/005* (2013.01); *E02B 11/00* (2013.01); *F16L 9/00* (2013.01)

(58) Field of Classification Search
CPC .................................................. E01B 11/005
See application file for complete search history.

(56) References Cited

U.S. PATENT DOCUMENTS 994,155 A * 6/1911 Harris .................. E02B 11/005
405/43
3,563,038 A * 2/1971 Healy .................. E02B 11/005
405/45
(Continued)

FOREIGN PATENT DOCUMENTS

CA       2154239          1/1997
CA       2154239 A1 *     1/1997   ............ E02B 11/005
(Continued)

OTHER PUBLICATIONS

International Search Report and Written Opinion of the International Searching Authority for PCT Application No. PCT/US2018/061094, dated Feb. 20, 2019.

*Primary Examiner* — Janine M Kreck
(74) *Attorney, Agent, or Firm* — Gardner Groff & Greenwald, PC.

(57) ABSTRACT

A low-profile fluid collection conduit includes an elongate outer cover having an upper portion and a lower portion generally opposite the upper portion, with the outer cover being much wider than it is tall and defining an interior volume. An elongate rigid spacer is fitted within the interior volume of the elongate outer cover, with the elongate spacer allowing the majority of the interior volume to be unfilled so as to permit the flow of fluid along and within the elongate outer cover. The collection conduit is used with a fluid-impermeable membrane as part of a landfill fluid collection and conveyance system.

17 Claims, 12 Drawing Sheets

Related U.S. Application Data

(60) Provisional application No. 62/585,586, filed on Nov. 14, 2017.

(51) Int. Cl.
 *F16L 9/00* (2006.01)
 *B09B 1/00* (2006.01)

(56) References Cited

U.S. PATENT DOCUMENTS

| | | | | |
|---|---|---|---|---|
| 4,057,500 A | * | 11/1977 | Wager | E02B 11/005 210/170.07 |
| 4,317,452 A | | 3/1982 | Russo et al. | |
| 4,442,901 A | * | 4/1984 | Zison | E21B 43/305 166/369 |
| 4,596,491 A | * | 6/1986 | Dietzler | F16L 9/18 405/154.1 |
| 4,925,342 A | * | 5/1990 | Hendy | E02B 11/00 405/36 |
| 5,458,436 A | * | 10/1995 | Plowman | E01C 13/02 405/36 |
| 5,634,741 A | * | 6/1997 | Tremblay | E02B 11/005 24/462 |
| 6,065,901 A | * | 5/2000 | Stevens | E02D 31/00 405/128.15 |
| 6,280,117 B1 | | 8/2001 | Obermeyer et al. | |
| 8,162,567 B2 | * | 4/2012 | Obermeyer | E03F 1/002 405/50 |
| 8,777,515 B1 | * | 7/2014 | Donlin | E02B 11/005 405/45 |
| 10,697,145 B2 | * | 6/2020 | Lewis | B09C 1/005 |
| 2004/0062610 A1 | * | 4/2004 | Hater | B09B 1/00 405/129.95 |
| 2005/0269253 A1 | | 12/2005 | Potts | |

FOREIGN PATENT DOCUMENTS

| | | |
|---|---|---|
| DE | 19703826 | 8/1998 |
| EP | 0075993 | 4/1983 |

\* cited by examiner

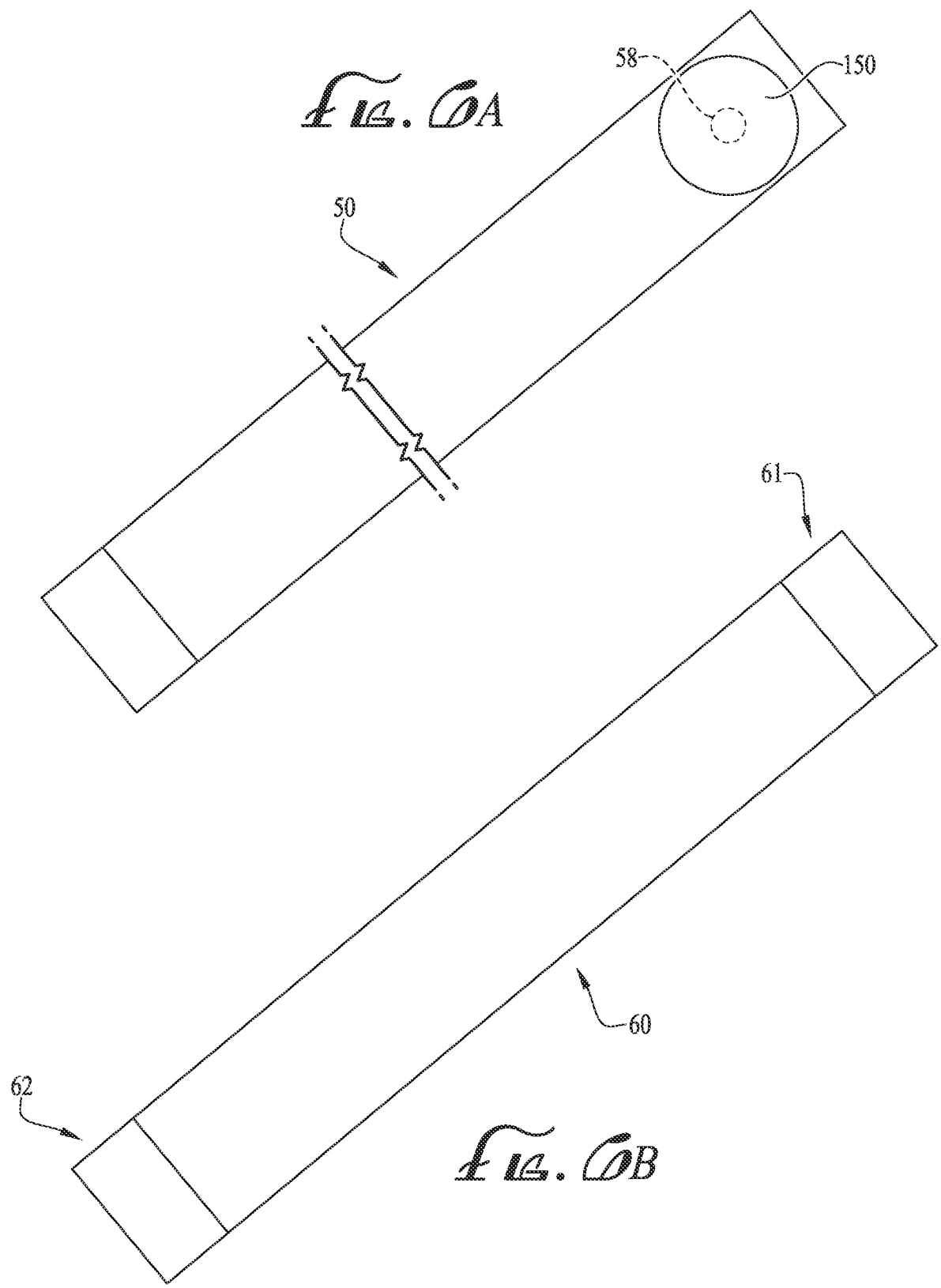

LOW-PROFILE FLUID CONDUIT/COLLECTOR AND SYSTEM

CROSS-REFERENCE TO RELATED APPLICATION

This application is a continuation-in-part of U.S. Non-Provisional patent application Ser. No. 16/190,917 filed on Nov. 14, 2018, which claims the benefit of U.S. Provisional Patent Application Ser. No. 62/585,586 filed on Nov. 14, 2017, the entirety of which is hereby incorporated herein by reference for all purposes.

BACKGROUND

Technical Field

In many instances, a fluid needs to be moved over a large distance or collected over a large area. For example, as waste material decomposes in a landfill, it gives off various gases. In the past, it has been known to use pumps, piping, and wellheads to extract the gases from the landfill and collect the same. Such wellheads are often spaced about one per acre in a grid pattern. Such systems of collecting the gases can be shut down by many factors, including power failures. To prevent the undesirable build-up of such gases in the event of non-operation of the extraction system, it has often been known to employ a grid pattern of vents spaced between the extraction wellheads, often at the same one per acre density.

As described in published U.S. Patent Application Number 20060034664, conventional gas extraction wells at landfills often involve deep wells attached to a network of pipes and a gas pump (blower) that applies vacuum (negative pressure) to extract the gas from the stored waste as the waste decomposes.

A prior art arrangement according to the above published patent application is shown in FIG. 1. Landfill 1 containing waste 2 generates biogas (biogas flows shown by the arrows). Biogas is collected and extracted through a well 3. The well 3 includes a gas-collecting well screen 16 and a gas-impermeable conduit 17 linking the well screen to the surface to draw biogas from the wellhead to the surface. Overlaying the majority of the waste 2 is a gas-permeable layer 5. The term "wellhead" refers to a portion of the gas-extraction well from which gas can be extracted. The well often includes a section of pipe having slots or other gas-flow apertures cut in it, referred to as a "well screen". Often, the well screen is also surrounded with gravel.

The gas-permeable layer is typically composed of a conductive porous matrix with gas flow paths. Often it is composed of rigid or semi-rigid particles of a large enough size to leave a significant void volume between particles. For instance, the gas-permeable layer may contain sand, gravel, wood chips, or shredded tires. Above the gas-permeable layer is a gas-containment layer 7. Biogas that rises from the landfill reaches the gas-permeable layer where it is trapped by the overlying gas-containment layer 7. The biogas migrates horizontally in the gas-permeable layer until it comes close to a well. Gas extraction from the well creates a vacuum that draws gas into the well. This vacuum draws biogas from the overlying gas-permeable layer down through the waste mass of the landfill to reach the well.

The area immediately beneath the gas-permeable high conductivity layer 5 through which a substantial fraction of the biogas from the gas-permeable layer passes as it travels to the gas-collection wellhead is the entrainment zone 9. On its passage through the waste 2, the gas from the gas-permeable layer mixes with biogas produced in the waste mass that has not gone through the gas-permeable layer. This helps to give a consistent content to the biogas that is withdrawn from the well. If gas is withdrawn directly from the gas-permeable conductive layer, the gas composition will vary more dramatically over time, sometimes containing a high air content and sometimes not. It is sometimes desirable to place an even more impermeable layer, such as geomembrane 15, directly over the zone of entrainment of gas from the permeable layer that is created by the deep well. Moreover, sometimes the entire landfill is covered with such a membrane.

FIG. 2 shows another prior art arrangement, this time showing a more shallow wellhead 26 used to withdraw near-surface or sub-surface gas from beneath a membrane M capping a waste W. The wellhead 26 is attached to an above-ground conduit by way of a vertical pipe.

FIG. 3 shows another prior art arrangement, this time depicting a landfill with multiple wellheads 30 used to withdraw near-surface or sub-surface gas from beneath the surface. The wellheads 30 are attached to an above-ground vent 31.

FIG. 4 shows another prior art arrangement similar to that in FIG. 2, this time showing a field of wellheads 40 spaced to extract the gases from a landfill and collect the same. Such wellheads are often spaced about one per acre.

SUMMARY OF THE INVENTION

In an example form, the invention relates to a low-profile fluid collection conduit, such as for use at landfills and the like. In one example, the fluid collection conduit includes an elongate outer cover having an upper portion and a lower portion generally opposite the upper portion, with the outer cover being much wider than it is tall and defining an interior volume. A rigid spacer is fitted within the interior volume of the elongate outer cover, with the spacer allowing the majority of the interior volume to be unfilled so as to permit the flow of fluid along and within the elongate outer cover.

Optionally, the elongate outer cover is non-perforated. Alternatively, the elongate outer cover can be perforated.

Preferably, the elongate outer cover is much thinner than it is tall and is flexible. Preferably, the elongate outer cover is made from one or more polymers.

Preferably, the elongate outer cover has an aspect ratio of width to height of more than 10:1. More preferably, the elongate outer cover has an aspect ratio of width to height of more than 20:1. In a preferred example, the elongate outer cover has an aspect ratio of width to height of more than 50:1.

Optionally, the elongate outer cover has a height of between about ½ inch and about 3 inches. More preferably, the elongate outer cover has a height of about one inch. Optionally, the elongate cover can have a width of between about one foot and about 8 feet.

In another example form, the present invention relates to a low-profile subsurface fluid conveyance conduit grid. The fluid conveyance grid includes at least one high-volume, low-profile fluid trunk conduit. It also includes at least two medium-volume, low-profile fluid branch conduits connected to and feeding into the at least one high-volume, low profile trunk conduit. Further, it includes at least four lower-volume, low-profile collector conduits connected to and feeding into the at least two medium-volume, low profile branch conduits, with each branch conduit being connected to at least two of the collector conduits. With this construction, surficial fluid can be drawn into the smaller collector conduits, gathered into the somewhat larger branch conduits, and finally into the trunk conduit. At least one of the trunk conduit, the branch conduits, and the collector conduits includes an elongate outer cover having an upper portion and a lower portion generally opposite the upper portion, with the outer cover being much wider than it is tall and defining an interior volume and including an elongate rigid spacer fitted within the interior volume of the elongate outer cover, the elongate spacer allowing the majority of the interior volume to be unfilled so as to permit the flow of fluid along and within the elongate outer cover.

Optionally, the fluid conveyed within the conveyance conduit grid includes at least some water. Optionally, the fluid includes surficial landfill gas.

Optionally, the grid is adapted for use under the surface of a landfill, with the grid further comprising an impermeable membrane positioned under the surface of the landfill and over the conduits.

Preferably, the grid is substantially cruciform in shape and at intersections of various conduits an adapter T or cross is provided. Optionally, the adapter T or cross has an upper opening and is provided with a cover for covering the upper opening.

Preferably, the grid includes at least one trunk conduit and the at least two branch conduits each comprise an elongate, non-perforated outer cover. Optionally, the at least four collector conduits each comprise an elongate perforated outer cover.

Preferably, the elongate outer cover comprises a polymer.

Preferably, the collector conduits have an aspect ratio of width to height of more than 10:1. More preferably, the aspect ratio is more than 20:1. Indeed, even an aspect ratio of more than 50:1 can be achieved.

BRIEF DESCRIPTION OF THE DRAWING FIGURES

FIG. 6A is a schematic, sectional view of a low-profile fluid collection conduit for extracting and/or conveying sub-surface gas from a waste landfill according to a preferred example form of the present invention.

FIG. 6B is a schematic plan view of a conduit of the present invention.

DESCRIPTION OF EXAMPLE EMBODIMENTS

In an example form, the invention relates to a low-profile fluid collection or conveyance conduit, such as for use at landfills and the like. In another example form, the present invention relates to a low-profile subsurface fluid conveyance conduit grid. Examples of these follow.

A Low-Profile Fluid Conduit and/or Collector and Related Components

In one example form, the present invention relates to a sub-surface collection or conveyance fluid conduit 50 for collecting and/or conveying sub-surface gas and the like from near the surface of landfills, typically for use with a geomembrane for capping a waste field. The geomembrane is generally impermeable to fluids in order to contain or cap the waste below, and thereby restrict the sub-surface gas from flowing into the atmosphere and to restrict atmospheric air from flowing into the waste below the geomembrane.

Figure 1:
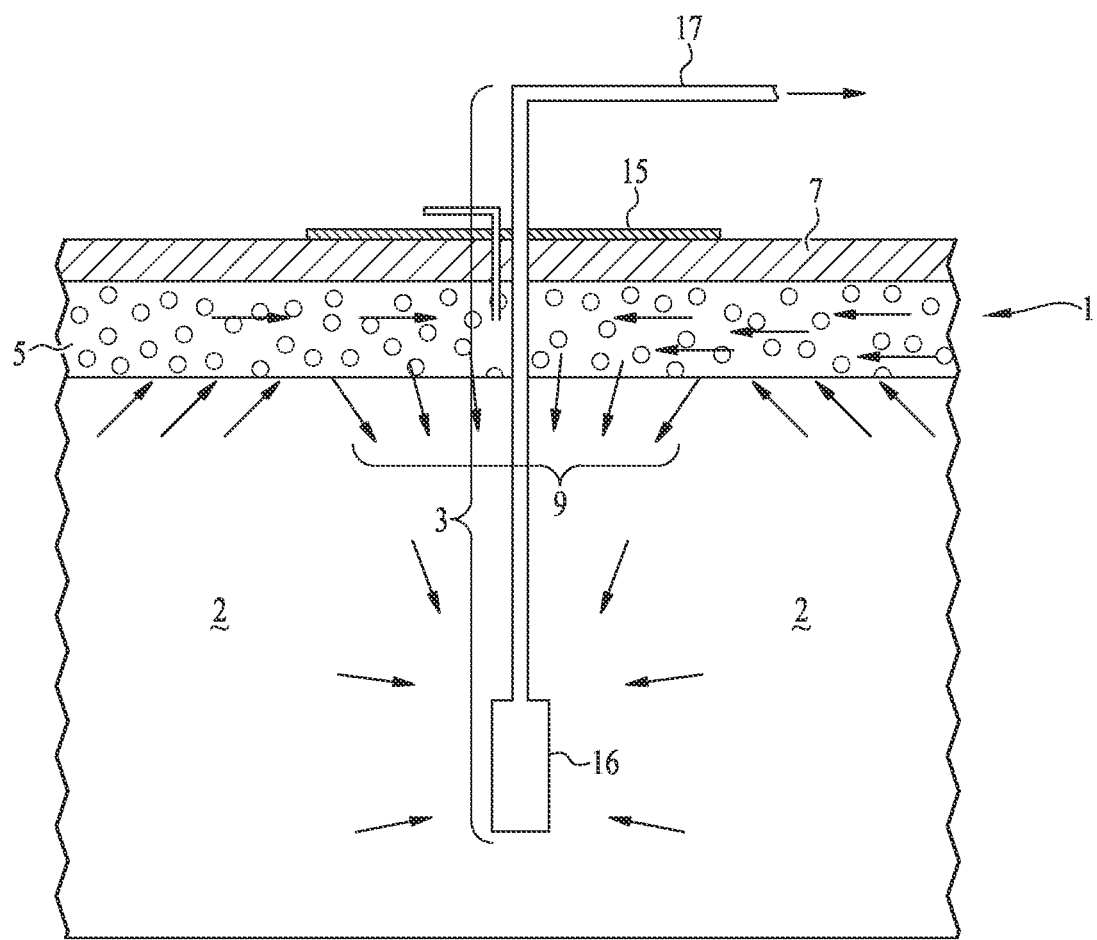
FIG. 1 is a schematic illustration of a first prior art wellhead for extracting sub-surface gas from a waste landfill.
Figure 2:
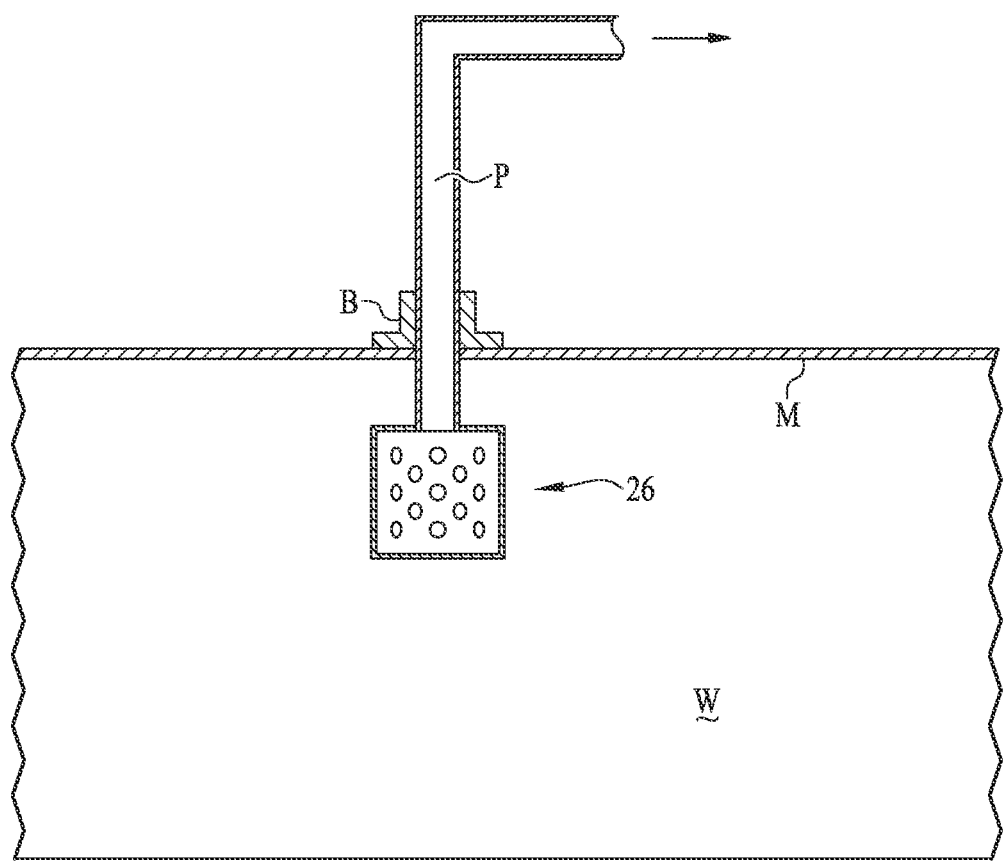
FIG. 2 is a schematic illustration of a second prior art wellhead for extracting sub-surface gas from a waste landfill.
Figure 3:
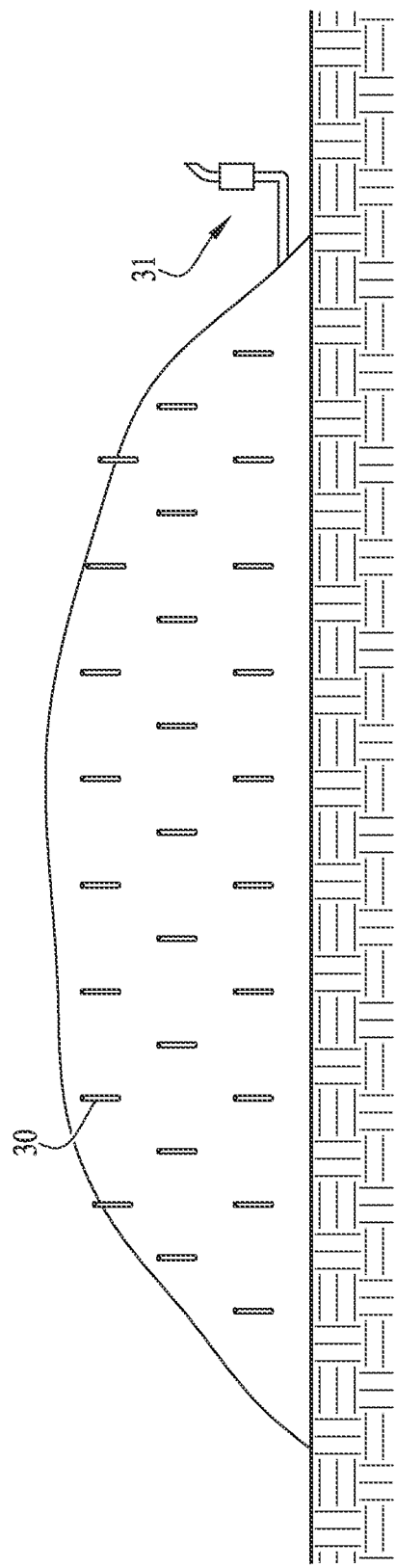
FIG. 3 is a schematic illustration of a prior art waste landfill with multiple wellheads for extracting sub-surface gas from a waste landfill.
Figure 4:
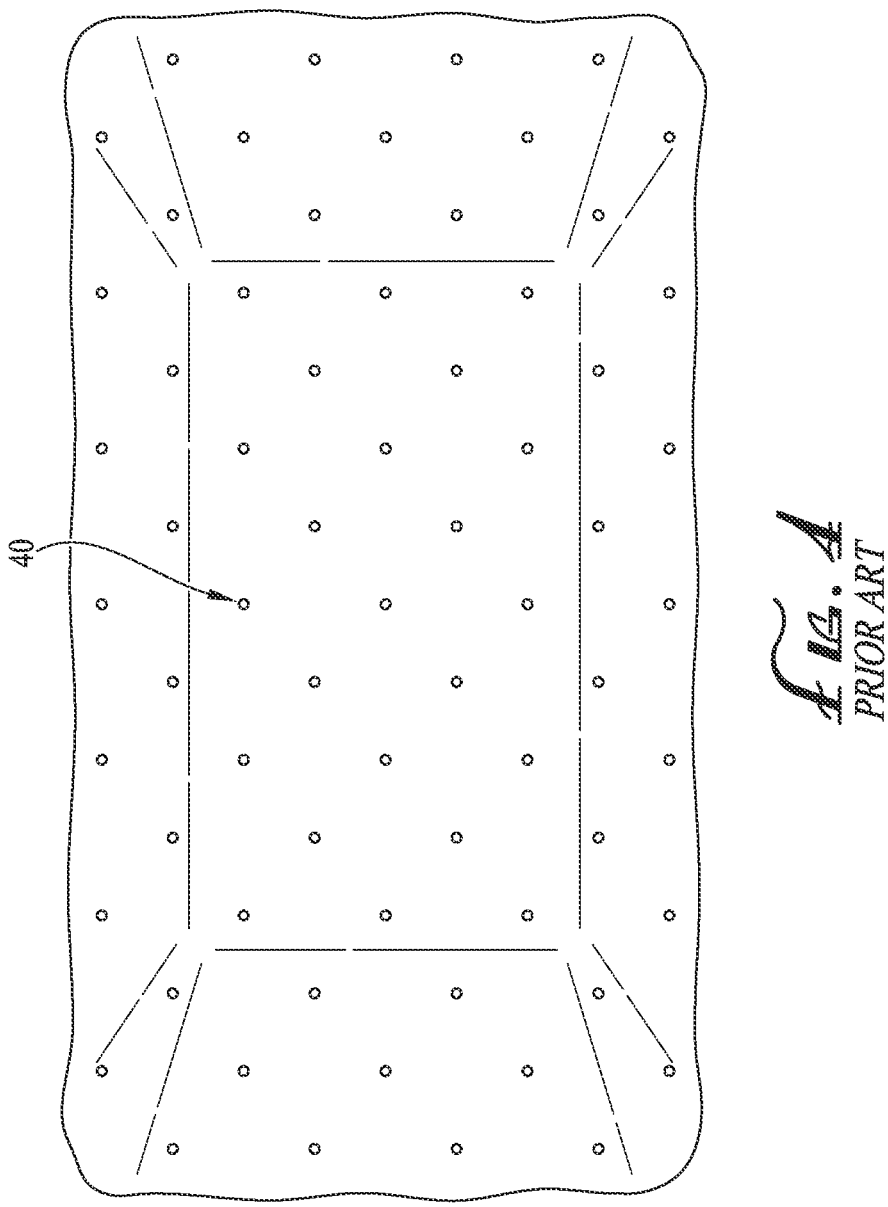
FIG. 4 is a schematic illustration of a prior art waste landfill with multiple wellheads for extracting sub-surface gas from a waste landfill.
Figure 5A:
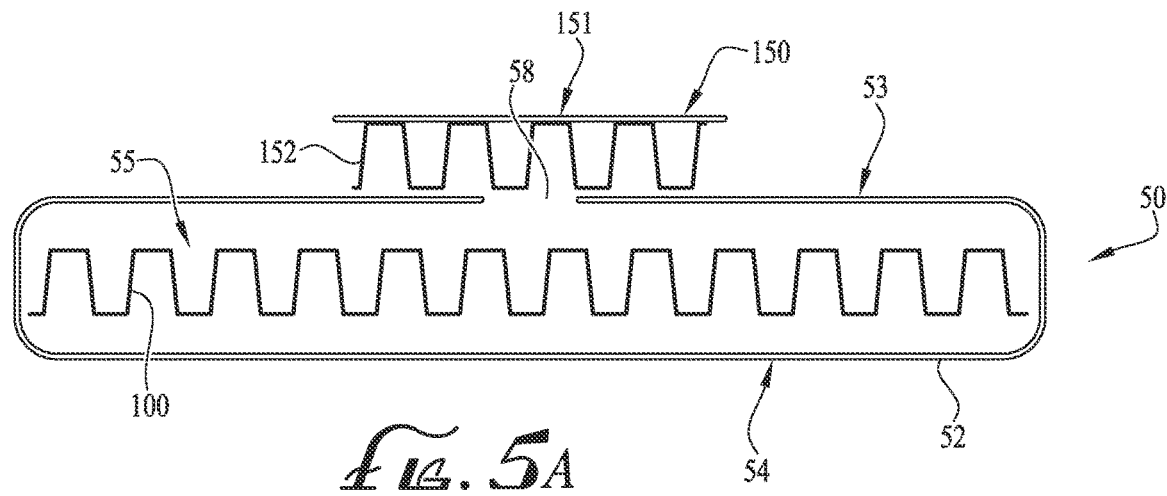
FIG. 5A is a schematic, sectional view of a low-profile fluid collection conduit for extracting and/or conveying sub-surface gas from a waste landfill according to a preferred example form of the present invention.

FIG. 5A is a schematic, sectional view of the conduit 50 for extracting and/or conveying sub-surface gas from a waste landfill according to a preferred example embodiment of the present invention. The conduit 50 includes a generally box-like outer casing 52 forming an enclosure with a substantially flat upper portion 53, a flat lower portion 54, and defining an interior volume 55. The casing 52 can include, or not include, perforations formed therein to provide for the admission of sub-surface gas into the interior volume, as desired. Preferably, the outer casing 52 comprises a fluid-impermeable membrane and the interior volume 55 provides an inner gas or fluid flow channel. Optionally, an upper orifice or inlet opening 58 is formed in the upper portion 53 of the enclosure or casing 52.

Preferably, the outer casing 52 is thin, and forms a conduit with a large aspect ratio of width to height. Also, the conduit 50 is adapted to be quite long and the interior volume is supported and maintained with the aid of a reinforcement corrugation 100. The corrugation 100 serves to provide structural rigidity and integrity against collapse, in order to maintain an open flow volume, despite forces that may otherwise tend to crush the casing 52.

Thus, in one form the low-profile fluid collection conduit 50 is adapted for use at landfills and the like. In one example, the fluid collection conduit 50 includes an elongate outer cover 52 having an upper portion 53 and a lower portion 54 generally opposite the upper portion, with the outer cover 52 being much wider than it is tall and defining an interior volume 55. An elongate rigid spacer 100 is fitted within the interior volume 55 of the elongate outer cover 52, with the elongate spacer 100 allowing the majority of the interior volume 55 to be unfilled so as to permit the flow of fluid along and within the elongate outer cover 52.

Figure 5B:
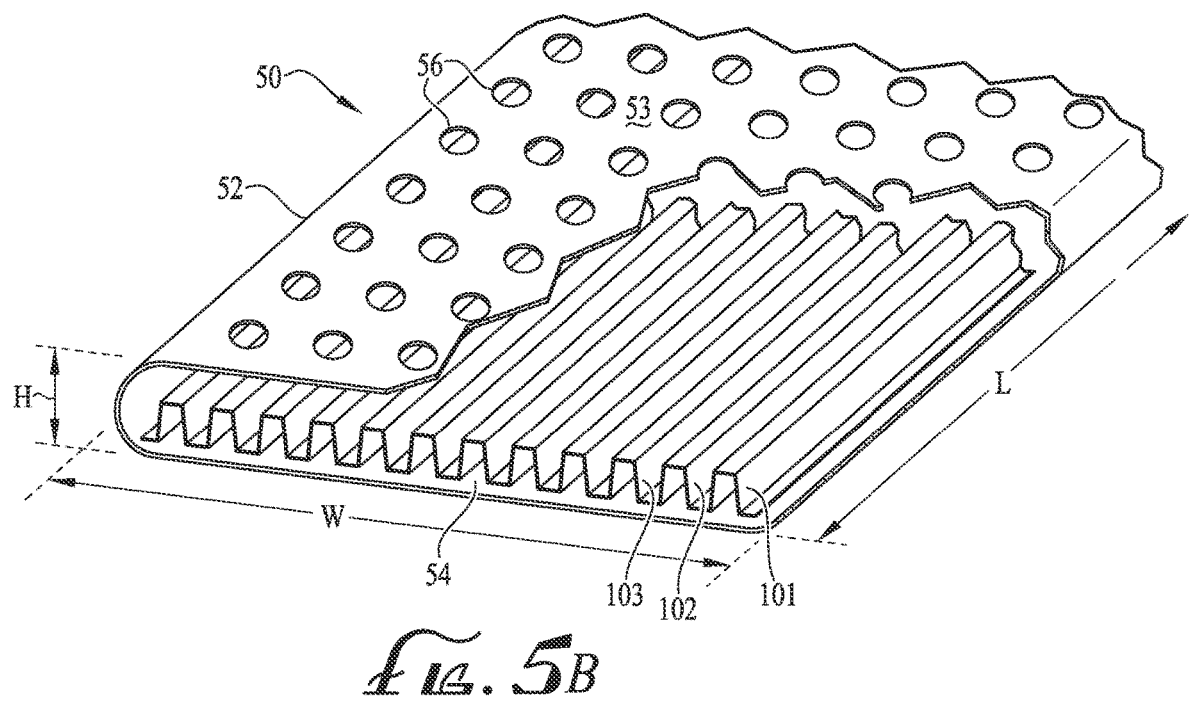
FIG. 5B is a schematic, perspective, partially cut-away view of a low-profile fluid collection conduit of FIG. 5A for extracting and/or conveying sub-surface gas from a waste landfill according to a preferred example form of the present invention.

Optionally, the elongate outer cover 52 is non-perforated. Alternatively, the elongate outer cover 52 can be perforated (see perforations 56 in cover 52 as depicted in FIG. 5B).

Preferably, the elongate outer cover 52 is much thinner than it is tall and is flexible. Preferably, the elongate outer cover is made from one or more polymers.

Preferably, the elongate outer cover 52 has an aspect ratio of width to height of more than 10:1. More preferably, the elongate outer cover 52 has an aspect ratio of width to height of more than 20:1. In a preferred example, the elongate outer cover 52 has an aspect ratio of width to height of more than 50:1.

Optionally, the elongate outer cover 52 has a height of between about ½ inch and about 3 inches. More preferably, the elongate outer cover has a height of about one inch. Optionally, the elongate cover 50 can have a width of between about one foot and about 8 feet. So for example, the cover 50 can be a foot wide, two feet wide, 3.5 feet wide, 4 feet wide, 6 feet wide, etc.

While the outer cover 52 can be made of flexible or rigid materials, the spacer 100 should be sufficiently rigid to maintain the shape of the conduit 50. The conduit 50 can be made much longer than the spacer 100 such that several or many such spacers 100 are employed along the length of the conduit 50. By using many spacers 100 of shorter lengths than the conduit 50, the conduit can be assembled with the spacers inside of it and then rolled up for convenient transport. The rolled-up assembly then can be unrolled at the installation site. The rigid spacer 100 can be made as long as the conduit 50, but at the expense of decreasing the flexibility of the assembly, making rolling it up for transport and unrolling it at the jobsite more difficult or impractical.

Preferably, a collection disk or cover 150 is provided over the aperture or opening 58 for shrouding the orifice/opening against becoming clogged with debris. The collection disk 150 is formed similarly to the conduit 50, with a thin upper covering 151 and a rigid spacer 152 supporting the thin upper cover 151. In this way, the thin upper cover 151 can be fabricated as a flexible element or as a rigid element, as desired.

FIG. 5B is a schematic, perspective, partially cut-away view of a low-profile fluid collection conduit of FIG. 5A for extracting and/or conveying sub-surface gas from a waste landfill according to a preferred example form of the present invention. As shown in this example, the fluid collection conduit 50 includes an elongate outer cover 52 having an upper portion 53 and a lower portion 54 generally opposite the upper portion. The outer cover 52 has a width W which is much wider than the height H of the cover 52. The aspect ratio between the width and the height is on the order of a magnitude and can even be approach two orders of magnitude. As noted earlier, the length L can be hundreds of feet. The elongate rigid spacer 100 fitted within the interior volume of the elongate outer cover 52 in this example takes the form of an elongate ribbed element, with ribs 101, 102, 103, etc., extending upwardly from a base plate or substrate 110, with the elongate spacer 100 allowing the majority of the interior volume 55 to be unfilled so as to permit the flow of fluid along and within the elongate outer cover 52. The ribs can be hollow or can be solid, as desired. As shown in this figure, the cover 52 can be provided with a large number of perforations, such as perforations 56 to allow gas/fluids to be drawn into the interior volume 55.

Figure 5C:
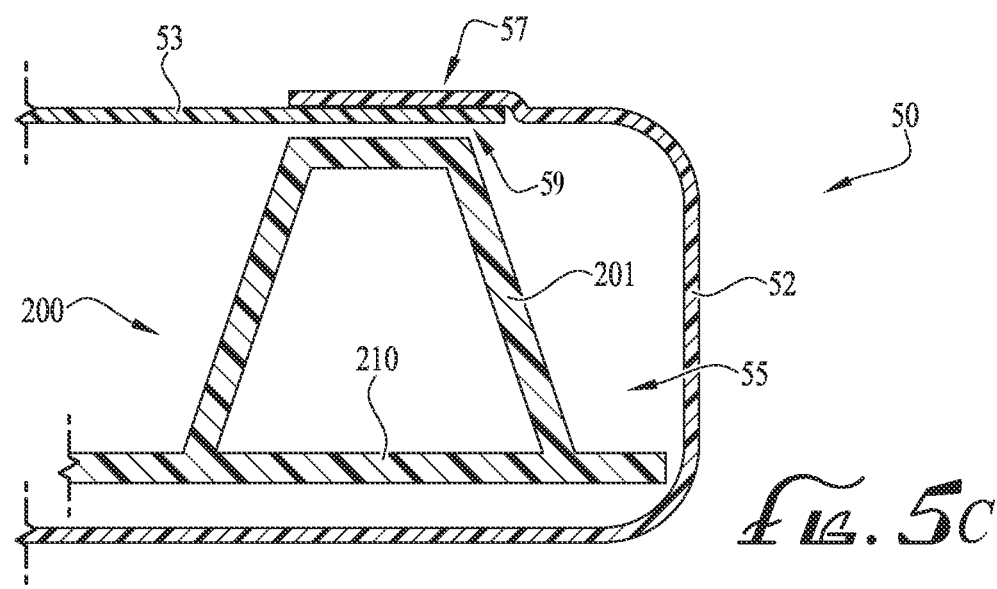
FIG. 5C is a schematic, sectional view of a low-profile fluid collection conduit of FIG. 5A for extracting and/or conveying sub-surface gas from a waste landfill according to another preferred example form of the present invention.

FIG. 5C is a schematic, sectional view of a low-profile fluid collection conduit of FIG. 5A for extracting and/or conveying sub-surface gas from a waste landfill according to another preferred example form of the present invention. In this example, the elongate rigid spacer 200 fitted within the interior volume of the elongate outer cover 52 in this example takes the form of an elongate dimpled element, with dimples or cones, such as cone 201, extending upwardly from a base plate or substrate 210, with the elongate spacer 100 allowing the majority of the interior volume 55 to be unfilled so as to permit the flow of fluid along and within the elongate outer cover 52. The cones, such as cone 201, are frusto-conical in shape. But a wide variety of shapes can be employed, such as hemispherical nubs, cylinders, pyramids, etc.

Figure 5D:
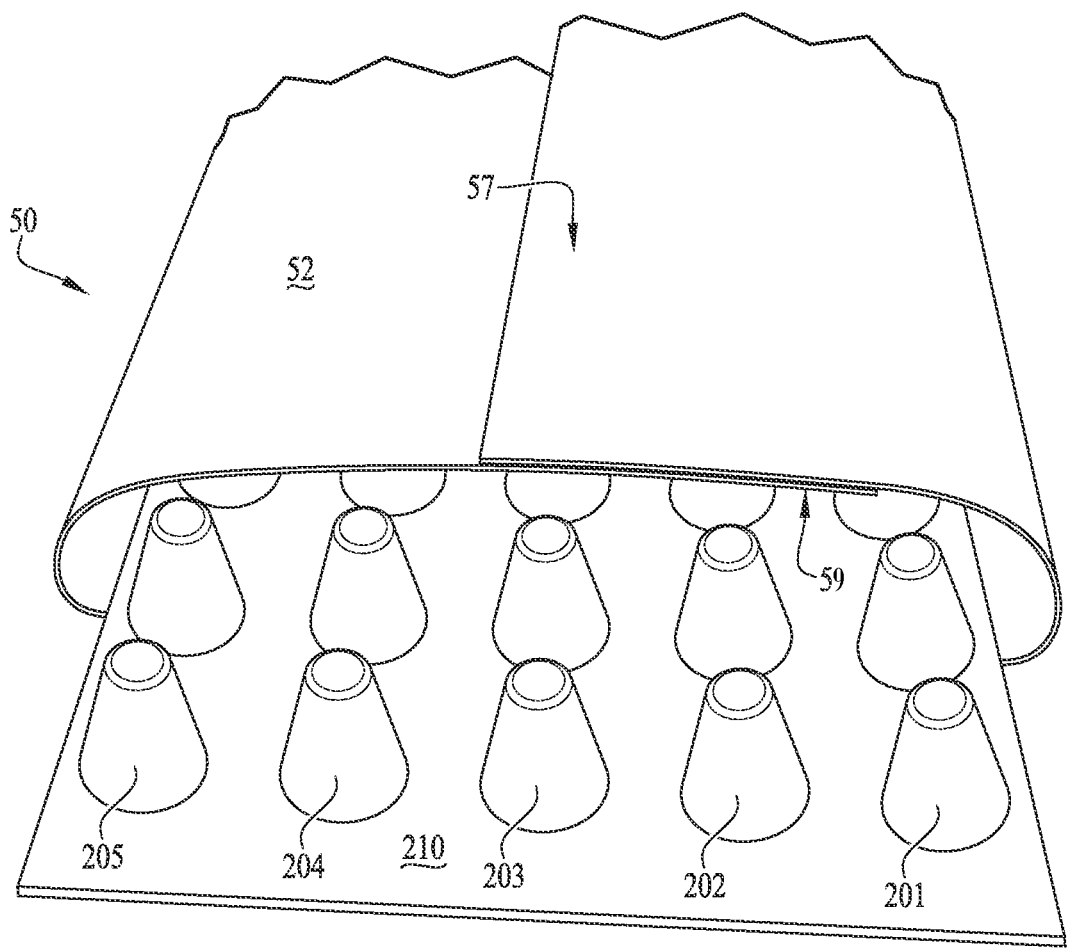
FIG. 5D is a schematic, perspective, partially cut-away view of a low-profile fluid collection conduit of FIG. 5C for extracting and/or conveying sub-surface gas from a waste landfill according to another preferred example form of the present invention.

FIG. 5D is a schematic, perspective, partially cut-away view of a low-profile fluid collection conduit of FIG. 5C for extracting and/or conveying sub-surface gas from a waste landfill according to another preferred example form of the present invention. In this example the cones can be seen to include a large number of cones, including cones 201, 202, 203, 204, 205, etc., extending upwardly from the base plate or substrate 210, FIG. 5C and FIG. 5D show how the first end portion 57 of the cover 52 overlies and abuts the opposite (second) end portion 59 of the cover 52. Indeed, these two end portions are secured to one another, as by heat bonding, adhesives, chemical bonding, etc.

FIG. 6A shows the conduit 50 in a plan view with a gas collection disk 150 thereupon positioned over a gas aperture 58. As depicted rather schematically, the length of the conduit 50 can be on the order of 200 feet, while the width of the conduit 50 would typically be on the order of 1 foot. The collection disk 150 is a low profile, high gas flow capacity structure. The collection disk 150 is generally a 4 inch (round or square) diameter and is placed over the collection orifice 58 to ensure gas flow into the system.

Preferably, the components of this rather flat pipe/conduit provide a gas collection lateral which is a low profile (flat pipe) high gas flow capacity structure encased within an impermeable membrane (hdpe, llpe, pvc, etc. . . . ). The unit is utilized as both a gas conveyance and collection point. The gas collection lateral is generally, but not necessarily, 200 ft. in length with a 1 inch height and widths from 1 to 2 foot. The lateral is sealed on one end with an orifice cut into the membrane and a collection disk placed over the orifice to ensure gas flow into the orifice and lateral. The body of the lateral can be fluid-impermeable with a collection orifice on one end and an opening on the other for installation into a reducer tee.

FIG. 6B shows a straight run section of conduit which can be inserted into a reducer tee at one end 61 and into a reducer tee or a pipe transition at the opposite end 62. This can be a low profile, high gas flow capacity structure encased within an impermeable membrane (hdpe, llpe, pvc, etc) and utilized for gas conveyance from one point (such as a reducer tee) to another. The sub-header (flat conduit) is generally 200 ft. in length with a 1 inch height and varying widths (8', 6.5', 4' and 2') depending upon gas flow capacity design requirements for the specific section of sub-header. Of course, these dimensions can be varied as desired. But such a structure allows for these advantageous dimensions in which a long run conduit can be very wide, very short in height and very long in length. While the body of the sub-header (flat pipe) is generally impermeable, the ends are left open for installation into the reducer tee.

Figure 7A:
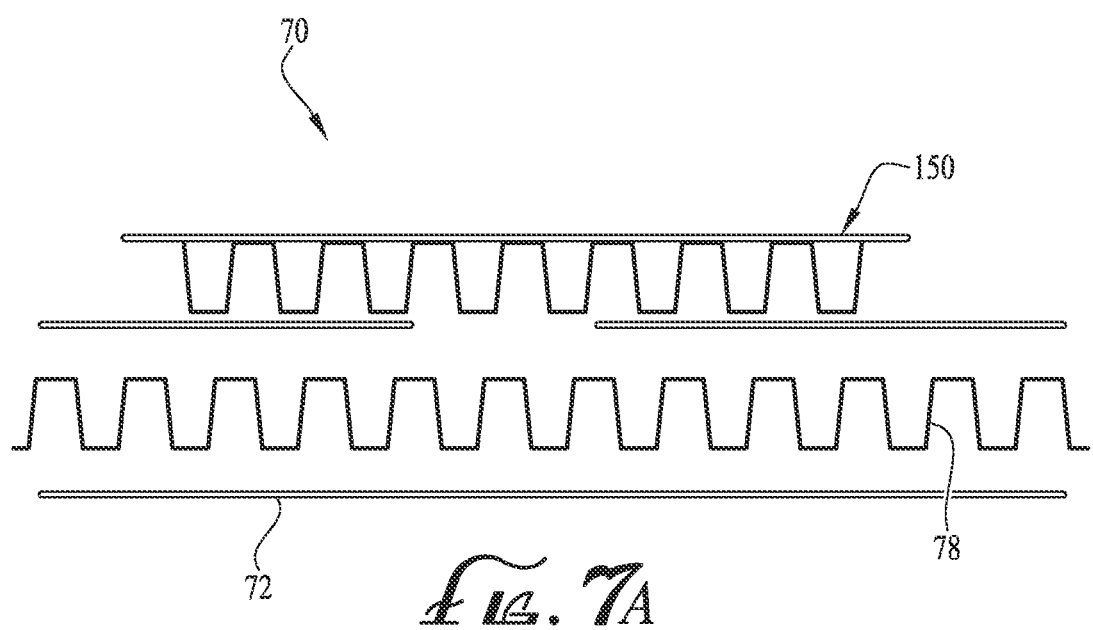
FIGS. 7A and 7B are schematic, sectional and plan views of a junction connector for connecting conduits in a cruciform pattern.
Figure 7B:
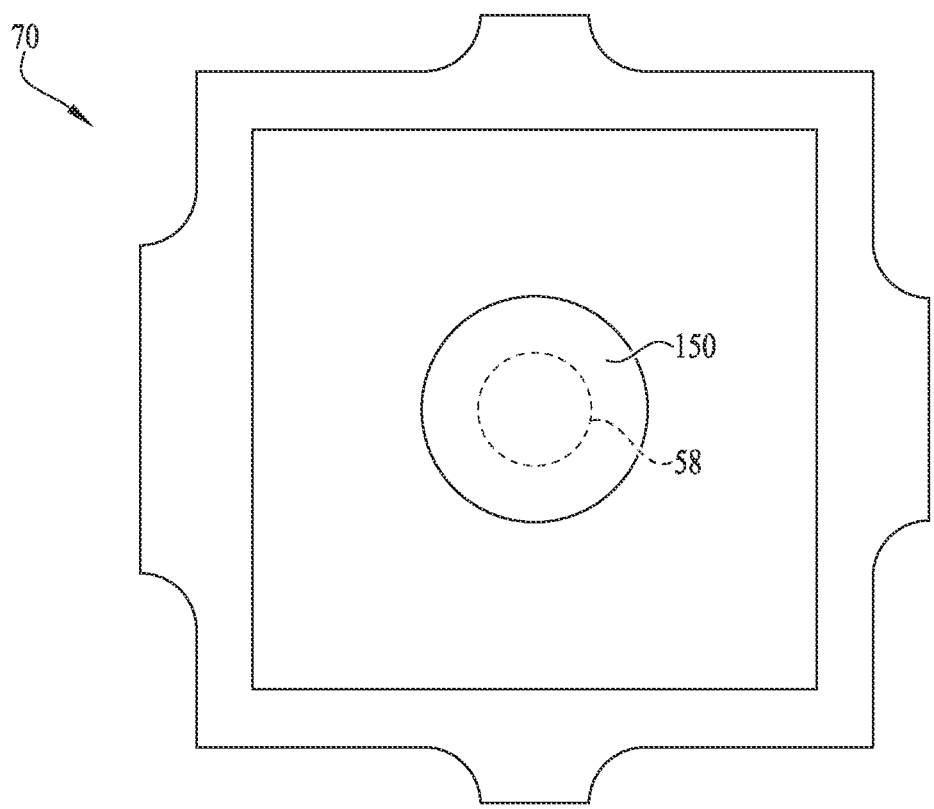
Figure 8:
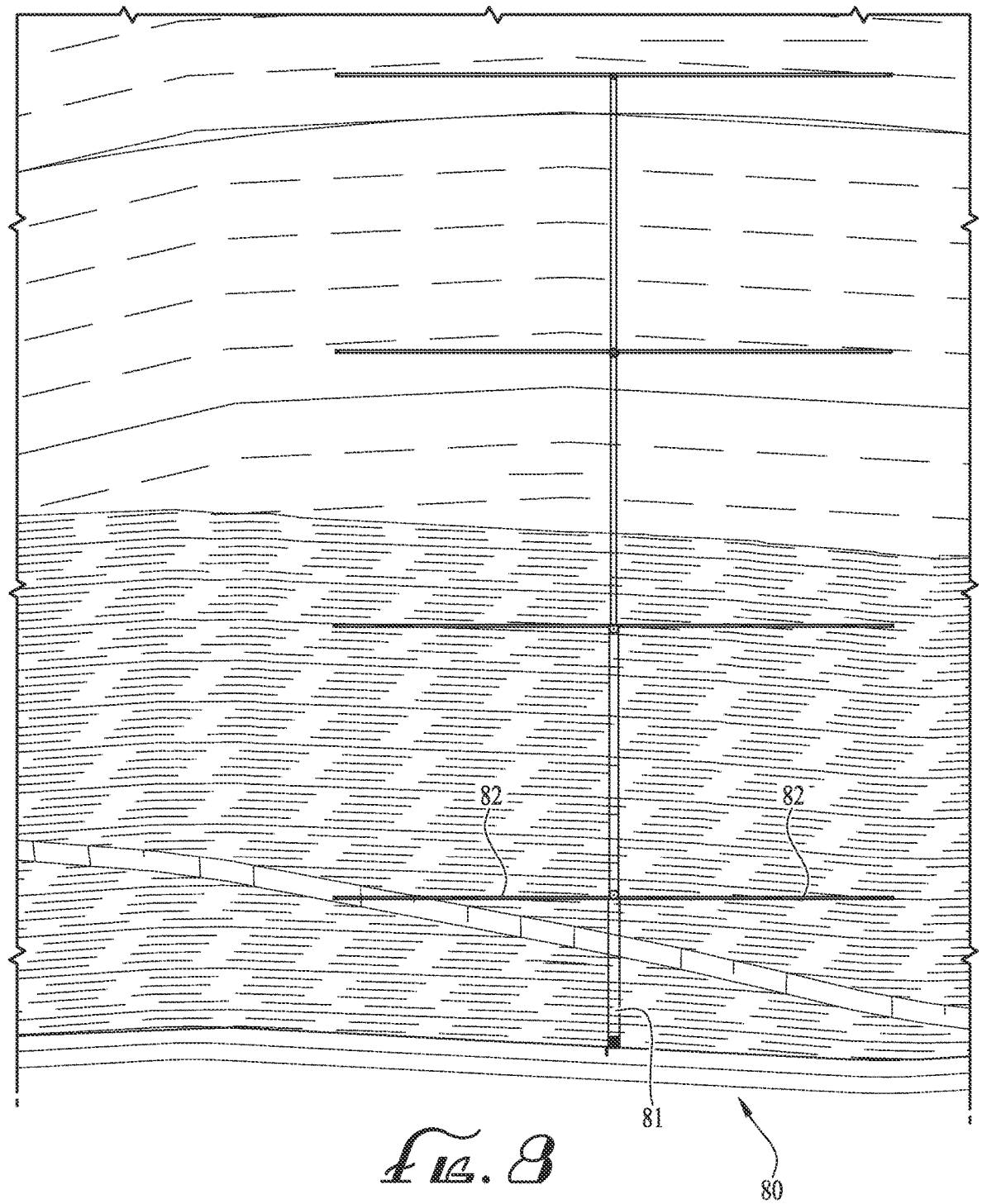
FIG. 8 is a schematic view of a collection and conveyance grid for extracting and/or conveying sub-surface gas from a waste landfill.
Figure 9:
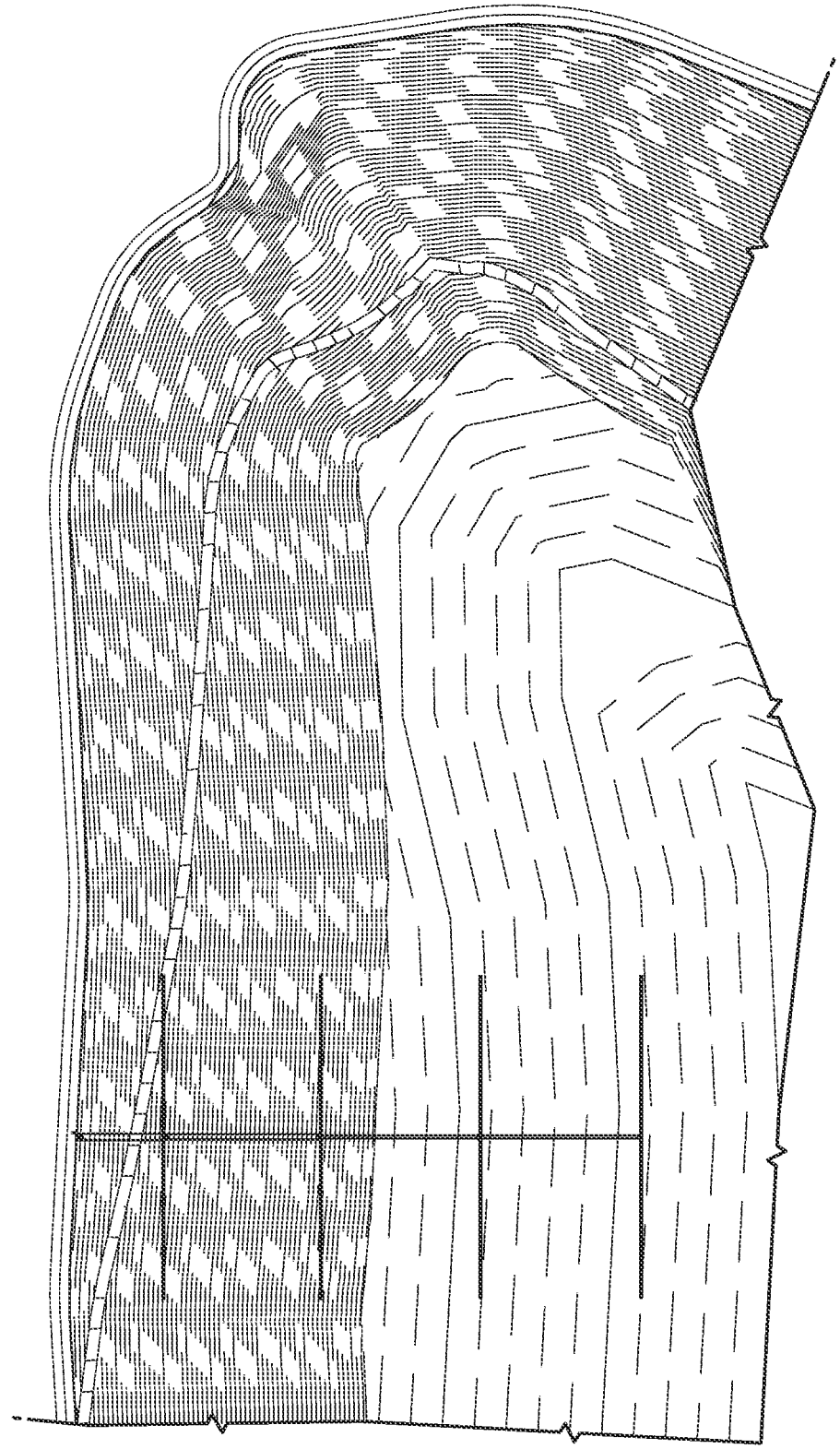
FIG. 9 is a schematic view of the collection and conveyance grid for extracting and/or conveying sub-surface gas from a waste landfill of FIG. 8, shown in conjunction with a three-dimensional landfill site.
Figure 10:
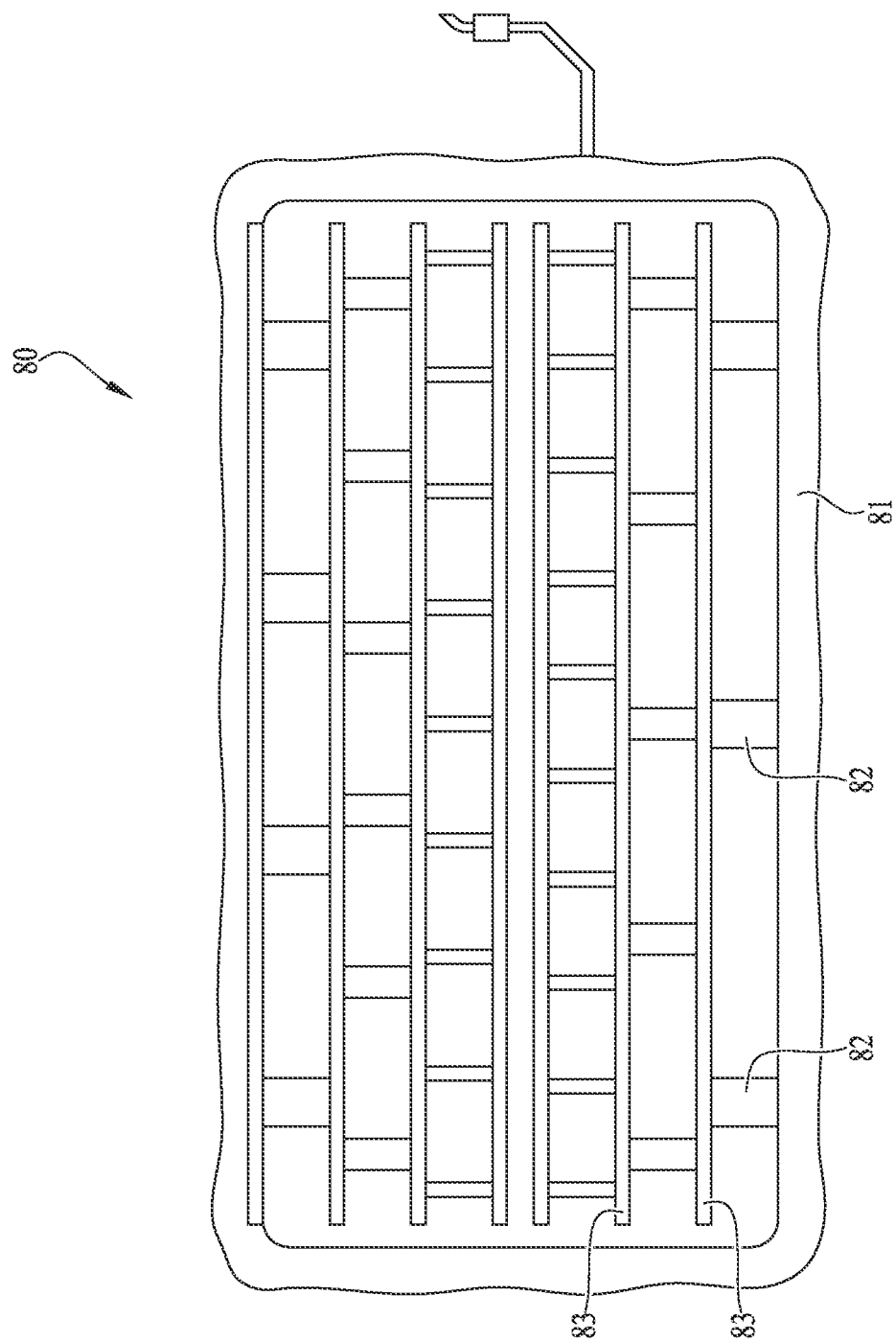
FIG. 10 is a schematic view of another example collection and conveyance grid for extracting and/or conveying sub-surface gas from a waste landfill.
Figure 11:
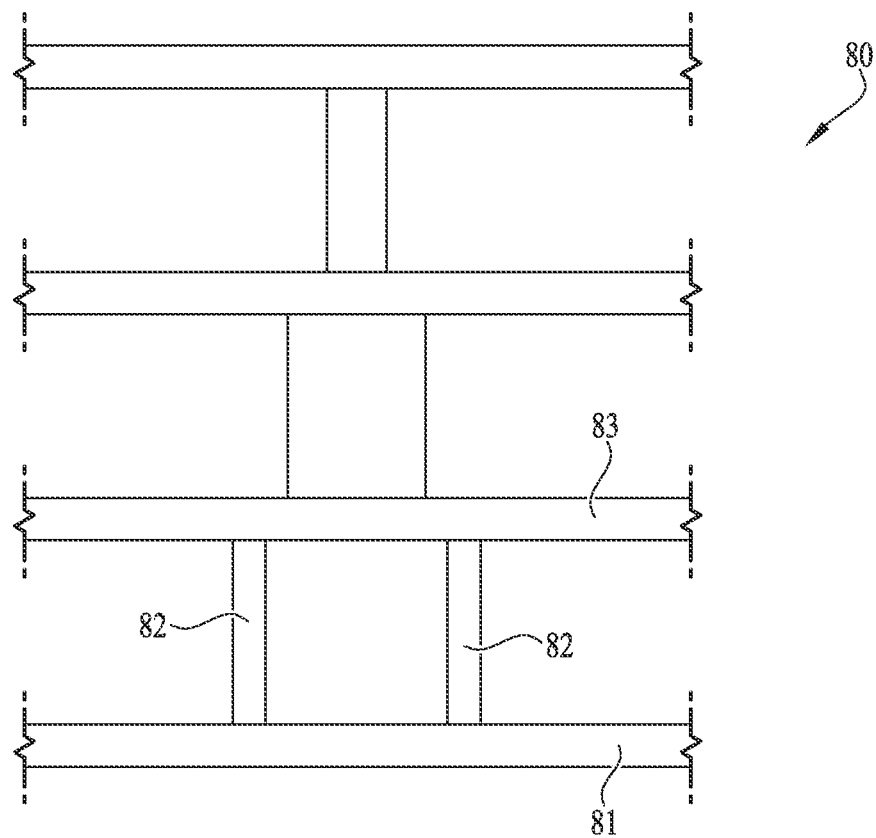
FIG. 11 is a schematic view of a portion of the example collection and conveyance grid of FIG. 10.

FIGS. 7A and 7B are schematic, sectional and plan views of a junction connector for connecting conduits in a cruciform pattern. This junction connector 70 comprises a reducer tee as a low profile, high gas flow capacity structure (spacer 78) encased within an impermeable membrane 72 (hdpe, Ilpe, pvc, etc.) and utilized as both a gas collection point and an intersecting point between sub-headers 50 and Gas collection laterals 60. The reducer tee 70 in an example form is 1 inch in height and designed to receive two gas laterals (1 to 2 ft in width) along with one or two gas collection sub-headers. Each reducer tee is sized according to the subheader width requirements (flow capacity design) for the specific location in the field.

The above-described components can be assembled and secured to one another by being welded, glued, taped, clamped or otherwise physically attached to one another, or by other means.

The sub-surface gas to be collected and withdrawn with the present invention can be any of several sub-surface gases, such as natural gas. The fluid collected and conveyed can be gaseous or liquid.

A Low-Profile Subsurface Fluid Conveyance or Collection Conduit Grid

In another example form as shown in FIGS. 8-11, the present invention relates to a low-profile subsurface fluid conveyance conduit grid 80. The fluid conveyance grid includes at least one high-volume, low-profile fluid trunk conduit 81. It also includes at least two medium-volume, low-profile fluid branch conduits 82 connected to and feeding into the at least one high-volume, low profile trunk conduit 81. Further, it includes at least four lower-volume, low-profile collector conduits 83 connected to and feeding into the at least two medium-volume, low profile branch conduits 82, with each branch conduit 82 being connected to at least two of the collector conduits 83. With this construction, surficial fluid can be drawn into the smaller collector conduits 83, gathered into the somewhat larger branch conduits 82, and finally into the trunk conduit 81.

At least one of the trunk conduit 81, the branch conduits 82, and the collector conduits 83 includes an elongate outer cover having an upper portion and a lower portion generally opposite the upper portion, with the outer cover being much wider than it is tall and defining an interior volume and including an elongate rigid spacer fitted within the interior volume of the elongate outer cover, the elongate spacer allowing the majority of the interior volume to be unfilled so as to permit the flow of fluid along and within the elongate outer cover.

Optionally, the fluid conveyed within the conveyance conduit grid includes at least some water. Optionally, the fluid includes surficial landfill gas. Optionally, the grid is adapted for use under the surface of a landfill, with the grid further comprising an impermeable membrane positioned under the surface of the landfill and over the conduits.

Preferably, the grid is substantially cruciform in shape and at intersections of various conduits an adapter T or cross is provided. Optionally, the adapter T or cross has an upper opening and is provided with a cover for covering the upper opening.

Preferably, the grid includes at least one trunk conduit and the at least two branch conduits each comprise an elongate, non-perforated outer cover. Optionally, the at least four collector conduits each comprise an elongate perforated outer cover.

Preferably, the elongate outer cover comprises a polymer.

Preferably, the collector conduits have an aspect ratio of width to height of more than 10:1. More preferably, the aspect ratio is more than 20:1. Indeed, even an aspect ratio of more than 50:1 can be achieved.

The system is similar to a surficial gas collection system in that it also works with the landfill's continual gas generation and resulting internal positive pressures to push gas to the surface where it is trapped below an impermeable membrane. However, the present gas collection system is differentiated from all other gas collection methods by utilizing a sealed flat piping network with collection points (collection disks) below the membrane (final closure, interim) at locations determined by landfill gas generation modeling.

The system design, coupled with a membrane cover, creates a superior barrier and conveyance system for fugitive emissions. The radius of influence of the system can be every square foot between the waste mass and the atmosphere.

The system requires no drilling (wells), no trenching (buried piping), and no above-ground piping. It also produces no condensate, and allows for a significant reduction in effort in monitoring of collection points.

The system is a designed and manufactured solution that provides for an easy and quick installation of a gas collection system that requires reduced capital costs, lowered O&M costs, stability in gas collection management along with a significant reduction in condensate generation.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A low-profile fluid collection conduit grid, such as for use at landfills and the like, comprising a plurality of conduits,
   wherein at least one of the plurality of conduits includes:
      an elongate outer cover having an upper portion and a lower portion generally opposite the upper portion, with the outer cover being much wider than it is tall and defining an interior volume; and
      an elongate rigid spacer fitted within the interior volume of the elongate outer cover, the elongate spacer allowing the majority of the interior volume to be unfilled so as to permit the flow of fluid along and within the elongate outer cover, wherein the elongate outer cover has an aspect ratio of width to height of more than 10:1; and wherein an opening is provided for admitting fluid into the fluid collection conduit grid at at least one intersecting point between the plurality of conduits.

2. A low-profile fluid collection conduit grid as claimed in claim 1 wherein the elongate outer cover is non-perforated.

3. A low-profile fluid collection conduit grid as claimed in claim 1 wherein the elongate outer cover is perforated.

4. A low-profile fluid collection conduit grid as claimed in claim 1 wherein the elongate outer cover is much thinner than it is tall and is flexible.

5. A low-profile fluid collection conduit grid as claimed in claim 1 wherein the elongate outer cover comprises a polymer.

6. A low-profile fluid collection conduit grid as claimed in claim 1 wherein an adapter T or cross is provided at the at least one intersecting point.

7. A low-profile fluid collection conduit grid as claimed in claim 6 wherein the adapter T or cross is provided with a cover for covering the opening.

8. A low-profile fluid collection conduit grid as claimed in claim 1 wherein the elongate outer cover has an aspect ratio of width to height of more than 20:1.

9. A low-profile fluid collection conduit grid as claimed in claim 1 wherein the elongate outer cover has an aspect ratio of width to height of more than 50:1.

10. A low-profile fluid collection conduit grid as claimed in claim 1 wherein the elongate outer cover has a height of between about ½ inch and about 3 inches.

11. A low-profile fluid collection conduit grid as claimed in claim 1 wherein the elongate outer cover has a height of about one inch.

12. A low-profile fluid collection conduit grid as claimed in claim 1 wherein the fluid includes at least some water.

13. A low-profile fluid collection conduit grid as claimed in claim 1 wherein the fluid is surficial landfill gas.

14. A low-profile fluid collection conduit grid as claimed in claim 1 wherein such is adapted for use under the surface of a landfill, the grid further comprising an impermeable membrane positioned under the surface of the landfill and over the conduits.

15. A low-profile fluid collection conduit grid as claimed in claim 1 comprising at least one trunk conduit and at least two branch conduits, each including an elongate, non-perforated outer cover.

16. A low-profile fluid collection conduit grid as claimed in claim 1 wherein the plurality of conduits are arranged in a grid and wherein at least four collector conduits are provided, each including an elongate perforated outer cover.

17. A low-profile subsurface fluid conveyance conduit grid as claimed in claim 1 wherein the elongate outer cover comprises a polymer.

* * * * *